United States Patent
de Verduzan et al.

(10) Patent No.: US 6,792,748 B2
(45) Date of Patent: Sep. 21, 2004

(54) COOLING SYSTEM FOR A GAS TURBINE ENGINE POST-COMBUSTION JET NOZZLE

(75) Inventors: Léopold Jean-Marie de Verduzan, Les Ecrennes (FR); Maurice Floreani, Guignes (FR); Jacques André Michel Roche, Lisses (FR)

(73) Assignee: Snecma Moteurs, Paris (FR)

( * ) Notice: Subject to any disclaimer, the term of this patent is extended or adjusted under 35 U.S.C. 154(b) by 29 days.

(21) Appl. No.: 10/348,775

(22) Filed: Jan. 23, 2003

(65) Prior Publication Data

US 2003/0182929 A1 Oct. 2, 2003

(30) Foreign Application Priority Data

Jan. 31, 2002 (FR) ............................................. 02 01122

(51) Int. Cl.[7] ................................................ F02K 1/82
(52) U.S. Cl. ...................... 60/266; 60/766; 239/127.1; 239/127.3; 239/265.17; 239/265.37
(58) Field of Search ............................... 60/226.2, 266, 60/766; 239/265.17, 127.1, 127.3, 265.33–265.41

(56) References Cited

U.S. PATENT DOCUMENTS

| 2,910,828 | A | * | 11/1959 | Meyer et al. ................. 60/266 |
| 3,243,126 | A | * | 3/1966 | Kurti et al. ............... 239/127.3 |
| 3,612,400 | A | * | 10/1971 | Johnson et al. ......... 239/265.19 |
| 3,848,697 | A | * | 11/1974 | Jannot et al. ............ 239/127.3 |
| 4,363,445 | A | | 12/1982 | Bouiller et al. |
| 4,718,230 | A | * | 1/1988 | Honeycutt et al. ............ 60/766 |
| 5,586,431 | A | | 12/1996 | Thonebe et al. |
| 5,690,279 | A | * | 11/1997 | Kramer et al. ........... 239/127.3 |
| 5,813,609 | A | | 9/1998 | Ellerhorst |
| 6,284,323 | B1 | | 9/2001 | Maloney |
| 6,301,877 | B1 | | 10/2001 | Liang et al. |

FOREIGN PATENT DOCUMENTS

| EP | 1333172 A1 | * | 1/2003 |
| GB | 851225 | | 10/1960 |
| GB | 878195 | | 9/1961 |

\* cited by examiner

Primary Examiner—Ted Kim
(74) Attorney, Agent, or Firm—Oblon, Spivak, McClelland, Maier & Neustadt, P.C.

(57) ABSTRACT

The invention concerns a cooling system for a post combustion jet nozzle. The jet nozzle includes a primary gas duct allowing a primary flow of gas, and a secondary air duct allowing a secondary flow of air. The secondary air duct surrounds the primary gas duct and is separated from it by a protective thermal shroud. The secondary air duct has a downstream end, and dampers surrounding an output section of the primary gas duct. The system includes a protective thermal shell in the secondary air duct, at the downstream end of said duct. The protective thermal shell bears an annular diaphragm extending out in front of the dampers and being provided with support sectors and inter-sector zones equipped with slots. The inter-sector zones define spaces between the diaphragm and the protective thermal shroud.

4 Claims, 3 Drawing Sheets

COOLING SYSTEM FOR A GAS TURBINE ENGINE POST-COMBUSTION JET NOZZLE

DESCRIPTION

1. Technical Field

The technical field of the present invention is the thermal protection of post-combustion jet nozzles used in aeronautic gas turbine engines such as turbojets.

2. State of the Prior Art

Post combustion jet nozzles for gas turbine engines have already been the subject of various constructions according to the prior art; Conventional jet nozzles placed at the exit of the post-combustion chamber are known. These are normally fitted with a protective thermal shroud circumscribing a gas duct that allows a flow of hot gases where the burnt gases are situated, and an air duct allowing a secondary flow of air containing relatively fresh air. Naturally, said protective thermal shrouds must be adapted to withstand considerable thermal constraints, because said shrouds are in the proximity of the burnt gases that are at a very high temperature.

As can be seen in FIG. 1, which shows a partial cross-section of a jet nozzle according to the prior art, said jet nozzle has a primary gas duct 20 surrounded by a secondary air duct 21. Said two ducts are circumscribed by a multi-perforated protective thermal shroud 22, suited to allowing the passage of air which acts to cool it, from the secondary air duct 21 towards the primary gas duct 20.

Said jet nozzle also comprises a leak tight part 23 that prevents the passage of the fresh air contained in the secondary air flow 21 in the direction of the jet nozzle dampers 24. Said jet nozzle dampers 24 are directly connected to control elements 25, at least part of which are located around the secondary air duct 21, at the level of a downstream end 22a of the protective thermal shroud 22.

However, it has been observed that when jet nozzles of the prior art are used, during full thrust operation (military power), in other words when the dampers 24 of the jet nozzle are in the closed position, the secondary air flow is subjected to an important rise in temperature at the level of the downstream end 22a of the protective thermal shroud 22.

In fact, the hot gases found in the gas flow 20 penetrate the secondary air flow 21, without the relatively fresh gases found in this flow managing to conserve a sufficiently low temperature so as not to create local overheating that could damage the control elements 25 for the dampers 24. Still referring to FIG. 1, the arrows symbolise the movements of the hot gases retained in the downstream direction and circulating in the direction of the secondary air flow 21 through the multi-perforated protective shroud 22. The consequences of this localised overheating in the secondary air flow 21 are that the parts of the jet nozzle, particularly the titanium casing, as well as the damper control elements located at the downstream end 22a of the protective thermal shroud 22, have an operational lifetime that is altered due to the rise in temperature.

Said overheating, directly linked to a high deflection angle of the dampers 24, creates resulting deformations on the parts located around the secondary air flow 21 as well as on those parts making up the control elements 25 for the dampers 24.

SUMMARY OF THE INVENTION

The object of the present invention is therefore to overcome, at least partially, the various disadvantages cited above by proposing a cooling system for a gas turbine engine post-combustion jet nozzle, limiting the effects of overheating of the secondary air flow, particularly when the gas turbine engine is operating at full thrust.

To achieve this, the invention is related to a cooling system for a post-combustion jet nozzle, said jet nozzle comprising a primary gas duct allowing a primary flow of gas, a secondary air duct allowing a secondary flow of air, said secondary air duct surrounding the primary gas duct and separated from it by a protective thermal shroud, said secondary air duct having a downstream end, dampers surrounding an output section of the primary gas duct, the cooling system comprising a protective thermal shell in the secondary air duct, at the downstream end of said duct. According to the invention, the protective thermal shell bears an annular diaphragm extending out in front of the dampers and being provided with support sectors and inter-sector zones equipped with slots, said inter-sector zones defining spaces between the diaphragm and the protective thermal shroud.

The main advantage of this invention is that it overcomes the overheating problems of the secondary air flow at the level of the downstream end of the secondary air duct, thus avoiding deformations to the parts located in this region. Apart from this absence of deformation, the cooling system according to the invention, by using a supplementary thermal protection in the secondary air duct, also participates in slowing down the reduction in the operational lifetime of the elements located in this critical region.

Moreover, the invention advantageously comprises means that make it possible to ventilate the jet nozzle dampers by means of the secondary air flow in the direction of said dampers. Previously, the air duct was sealed by means of a leak tight part that completely prevented the ventilation of said dampers. Its replacement by this diaphragm thus makes it possible for the air coming from the secondary air flow to pass in the direction of the jet nozzle dampers, and it does this whatever the temperature of the different parts making up the jet nozzle. The ventilation of the dampers favoured in this way thus makes it possible to avoid damaging said dampers due to temperatures that are too high to withstand, but also to increase the operational life of all of said parts.

In a preferential manner, the diaphragm is fastened onto the protective thermal shell, and allows a displacement of the protective thermal shroud in relation to the support sectors.

Said formed support sectors support the shroud and allow said protective thermal shroud to be accurately centred.

According to a preferred embodiment of the invention, the protective thermal shell is provided with fastening supports bearing on a casing circumscribing the outside of the secondary air duct.

Other characteristics and advantages of the invention will become clear from the detailed, non-limitative description that follows.

BRIEF DESCRIPTION OF THE DRAWINGS

The following description refers to the appended drawings, in which.

DETAILED DESCRIPTION OF A PREFERRED EMBODIMENT

Figure 1:
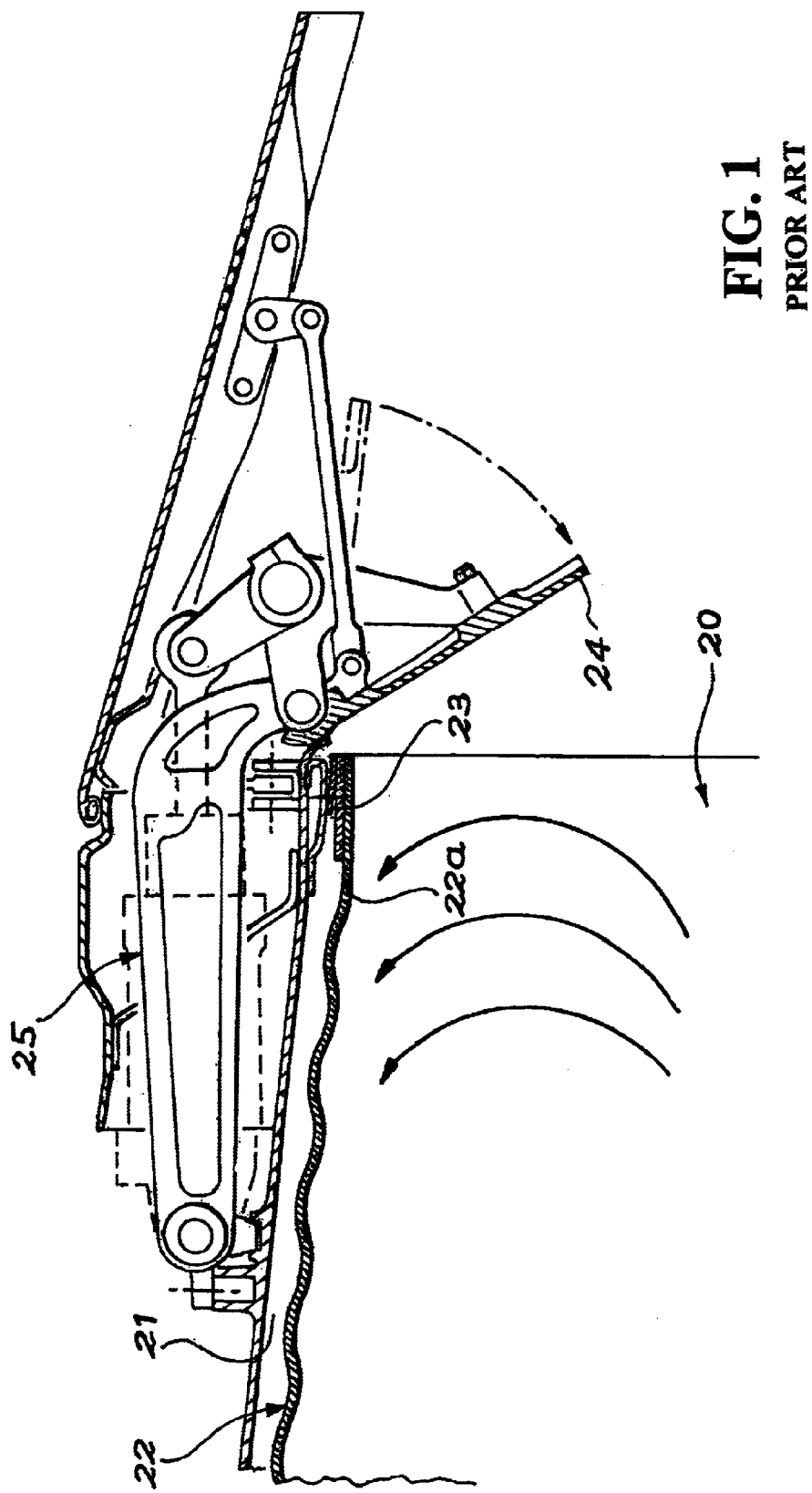
FIG. 1, already described, represents the prior art.
Figure 2:
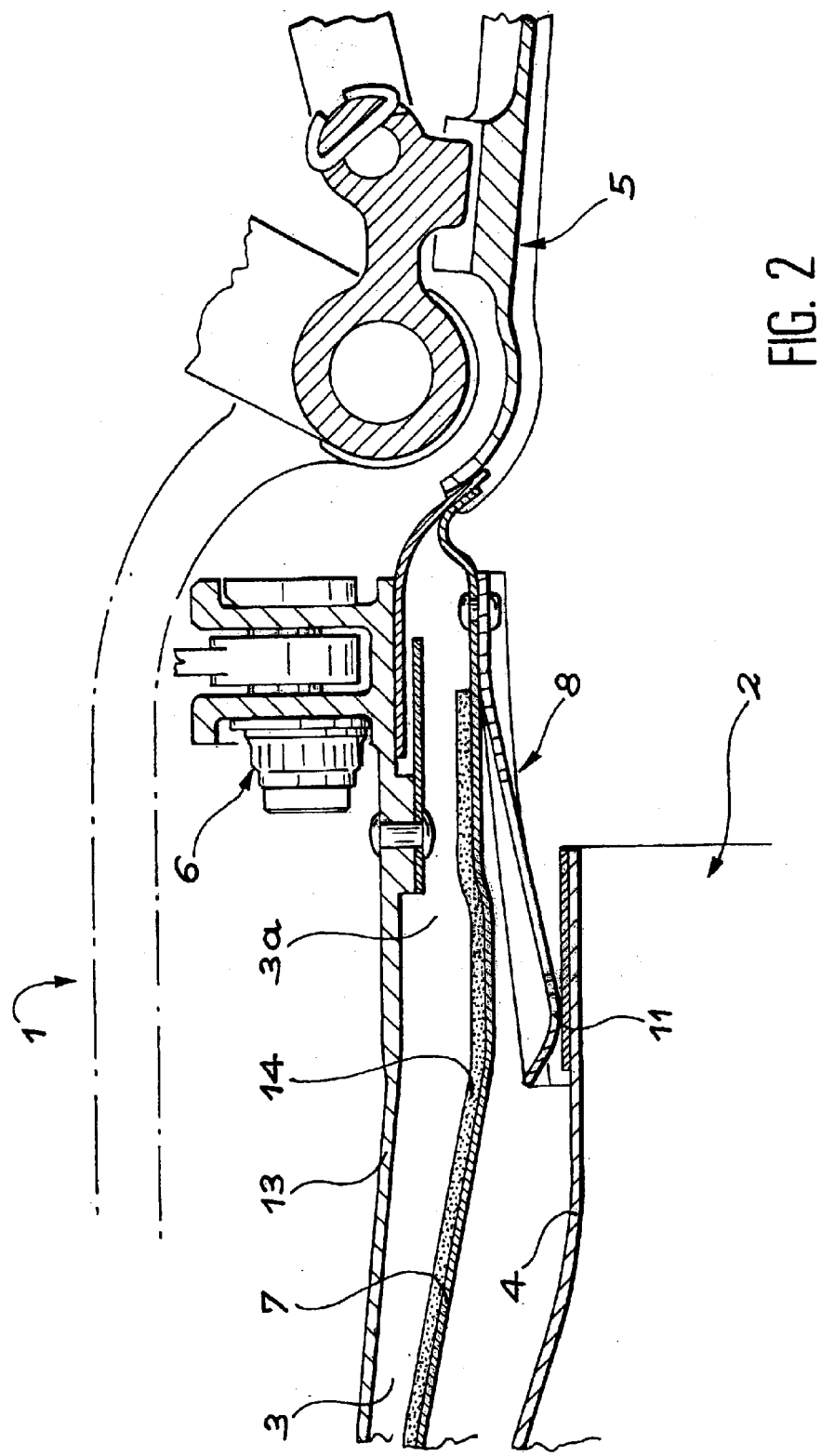
FIG. 2 represents a partial cross-section of a jet nozzle equipped with a cooling system according to a preferred embodiment of the invention.

Referring to FIG. 2, it can be seen a part of a post-combustion jet nozzle 1 equipped with a cooling system according to the invention. Said jet nozzle has a primary gas duct 2 allowing a flow of hot gases, said hot gases being intended to be used for the post-combustion. Around said primary gas duct 2, it can be seen a secondary air duct 3, circumscribed by a titanium casing 13, and allowing a flow of relatively fresh air. It should be noted that the secondary air duct 3 has a substantially annular shape.

Said two ducts 2, 3 are separated by means of a multi-perforated protective thermal shroud 4, and suited to allowing the gases to pass from one duct to the other. Moreover, the jet nozzle 1 comprises dampers 5 and control elements 6 for said dampers 5. Said dampers 5 are situated in such a way that they surround an output section of the primary gas duct 2, whereas the control elements 6 for the dampers 5 are placed, at least partially, around the secondary air duct 3. The cooling system for the jet nozzle 1 comprises a protective thermal shell 7, situated in the secondary air duct 3, at the level of a downstream end 3a of said duct. It is in fact at the level of said downstream end 3a of the secondary air duct 3 that the problem of overheating is the most important and therefore for it to be necessary to add an element to protect against the heat coming from the hot gases. The main purpose of said protective thermal shell 7 is then to protect the elements of the jet nozzle located at the level of said downstream end 3a, in particular the control elements 6 for the dampers 5 and the parts forming the secondary air duct 3.

Figure 3:
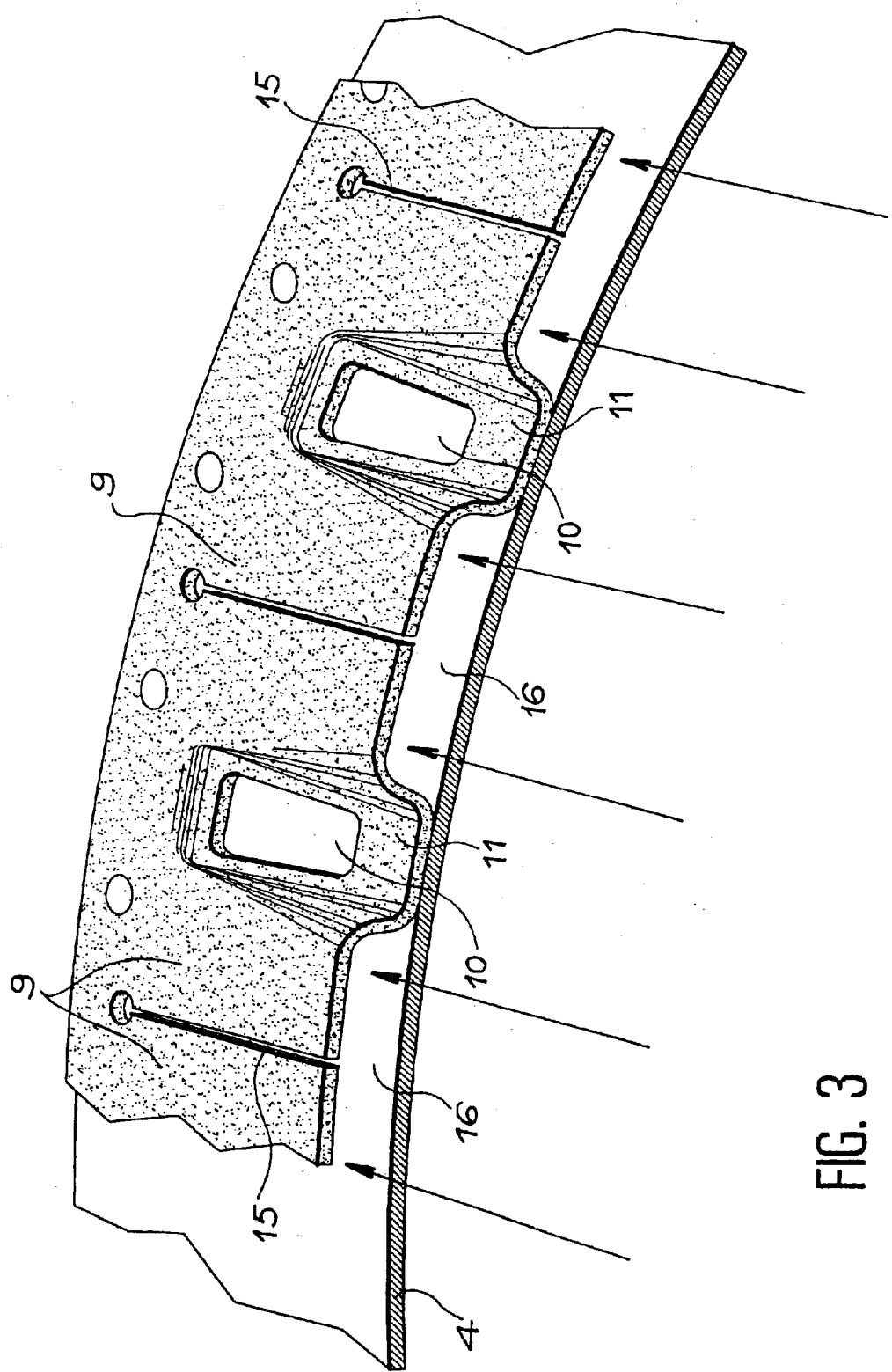
FIG. 3 represents a partial perspective view of the protective thermal shroud and the diaphragm of the cooling system represented in FIG. 2.

Referring to FIGS. 2 and 3, said protective thermal shell 7 bears an annular diaphragm 8, to which it is for example assembled using rivets. Said annular diaphragm 8 is formed in such a way as to place the support sectors 11 in contact with the protective thermal shroud 4, said support sectors 11 being regularly spaced and of a substantially conical shape. Moreover, the diaphragm 8 has inter-sector zones 9, each located directly between two support sectors 11, and jutting out towards the exterior of the diaphragm 8, said diaphragm being preferably formed by stamping.

Said diaphragm 8 extending out in front of the dampers 5 is provided with slots 15 formed on the inter-sector zones 9 between the support sectors 11, and openings 10 present on each support sector 11. It should be noted that the slots 15 provide flexibility to the diaphragm 8, and allow it to easily follow the deformations of the shroud 4 due to thermal dilation.

Said diaphragm 8 is rigidly fastened onto the protective thermal shell 7, whereas the contact between said diaphragm 8 and the protective thermal shroud 4 is assured by the support sectors 11. In fact, said support sectors, sticking out into the interior of the diaphragm 8, are in contact with the protective shroud 4, assuring in this manner a precise centring of said shroud by sliding on said support sectors 11, as well as maintaining a substantially constant ventilation flow rate.

Naturally, the openings 10 located on the support sectors 11 of the diaphragm 8 may be formed in several ways.

Moreover, the inter-sector zones 9 located between two support sectors 11 each define a space 16 between the annular diaphragm 8 and the protective thermal shroud 4. As can be seen in FIG. 3, each space 16 is also circumscribed by two directly consecutive support sectors 11. Thus, the air from the secondary air duct 3 can go through the spaces 16 to pass through the diaphragm 8 and arrive at the dampers 5, thus assuring the ventilation of said dampers.

The support sectors 11 comprise a trapezoidal part intended to be in contact on its small base with the protective thermal shroud 4, as well as an opening 10 for the gases coming out on one side in the secondary air duct 3, and on the other side in the direction of the dampers 5. Thus, this type of arrangement of spaces 16 and openings 10 on said diaphragm 8 make it possible to ensure a relatively constant ventilation flow on the dampers 5, despite the considerable deformations of the shroud 4, due to thermal dilation. By way of example, the displacements of the shroud 4 may be 14 mm axially and 4 mm radially.

FIG. 2 shows the dampers 5 open, which represents an active post-combustion state. One can see that the secondary air then laps the whole length of the dampers 5 without being substantially deviated, which makes its ventilation even more efficient than in the state of closed dampers corresponding to full thrust.

Still referring to FIGS. 2 and 3, the protective thermal shell 7 is provided with fastening supports (not shown) located on the periphery of said shell and bearing on a casing 13. Said supports then make it possible to fix the protective thermal shell 7 to the interior of the casing 13.

Moreover, the protective thermal shell 7 may be provided with additional protection. In fact, a thermally insulating material 14 may be arranged around the protective thermal shell 7, thus accentuating even more the effects of said shell on the elements to be protected.

Obviously, various modifications may be made by those skilled in the art to the cooling system that has just been described, uniquely by way of example and in nowise limitative.

What is claimed is:

1. Cooling system for a post combustion jet nozzle, said jet nozzle comprising a primary gas duct allowing a primary flow of gas, a secondary air duct allowing a secondary flow of air, said secondary air duct surrounding said primary gas duct and separated from it by a protective thermal shroud, said secondary air duct having a downstream end, dampers surrounding an output section of the primary gas duct, the cooling system comprising a protective thermal shell in the secondary air duct, at the downstream end of said duct, wherein the protective thermal shell bears an annular diaphragm extending out in front of the dampers and being provided with support sectors and inter-sector zones equipped with slots, said inter-sector zones defining spaces between the annular diaphragm end the protective thermal shroud.

2. Cooling system for a post combustion jet nozzle according to claim 1, wherein the diaphragm is fastened to the protective thermal shell and allows a displacement of the protective thermal shroud in relation to the support sectors.

3. Cooling system for a post combustion jet nozzle according to claim 1 or claim 2, wherein the protective thermal shell is provided with fastening supports bearing on a casing circumscribing the outside of the secondary air duct.

4. Cooling system for a post combustion jet nozzle according to claim 1, wherein a thermal insulation material is arranged around the protective thermal shell.

\* \* \* \* \*

UNITED STATES PATENT AND TRADEMARK OFFICE
CERTIFICATE OF CORRECTION

PATENT NO. : 6,792,748 B2  
DATED : September 21, 2004  
INVENTOR(S) : de Verduzan et al.

It is certified that error appears in the above-identified patent and that said Letters Patent is hereby corrected as shown below:

Column 1,
Line 13, change "art; Conventional" to -- art. Conventional --.

Column 4,
Line 51, change "end the" to -- and the --.

Signed and Sealed this

Twenty-fourth Day of May, 2005

JON W. DUDAS
*Director of the United States Patent and Trademark Office*